United States Patent [19]

Maki et al.

[11] Patent Number: 4,471,027
[45] Date of Patent: Sep. 11, 1984

[54] COATED SURFACES CAPABLE OF DECOMPOSING OILS

[75] Inventors: Masao Maki, Nabari; Yasunori Kaneko; Ikuo Kobayashi, both of Nara, all of Japan

[73] Assignee: Matsushita Electric Industrial Co., Ltd., Osaka, Japan

[21] Appl. No.: 480,380

[22] Filed: Apr. 5, 1983

Related U.S. Application Data

[63] Continuation-in-part of Ser. No. 263,177, May 13, 1980, abandoned, which is a continuation of Ser. No. 85,059, Oct. 12, 1979, abandoned.

[30] Foreign Application Priority Data

Feb. 13, 1978 [JP] Japan ................................. 54-15743
Oct. 16, 1978 [JP] Japan ................................. 53-127543
Jul. 26, 1979 [JP] Japan ................................. 54-95381

[51] Int. Cl.³ .......................... B32B 9/06; B32B 15/04
[52] U.S. Cl. ................................. 428/450; 126/19 R; 427/376.5; 427/397.8; 428/457; 428/702
[58] Field of Search ............... 427/376.4, 376.5, 397.8; 428/450, 457, 469, 472, 471, 702; 126/19 R; 252/455 R, 457

[56] References Cited

U.S. PATENT DOCUMENTS

| | | | |
|---|---|---|---|
| 3,256,207 | 6/1966 | Arnold | 252/455 R |
| 3,266,477 | 8/1966 | Stiles | 126/19 R |
| 3,451,949 | 6/1969 | Topsoe et al. | 252/457 |
| 3,460,523 | 8/1969 | Stiles et al. | 126/19 R |
| 3,547,098 | 12/1970 | Lee | 126/19 R |
| 3,576,667 | 4/1971 | Lee | 126/19 R |
| 3,627,560 | 12/1971 | Morgan | 428/450 |
| 3,969,542 | 7/1976 | Tomita et al. | 252/475 |
| 3,993,597 | 11/1976 | Stiles | 252/457 |
| 4,060,662 | 11/1977 | Bergeron et al. | 428/450 |
| 4,062,806 | 12/1977 | Roberts | 126/19 R |
| 4,101,449 | 7/1978 | Noda et al. | 252/457 |
| 4,140,834 | 2/1979 | Marcantonio et al. | 428/469 |
| 4,147,835 | 4/1979 | Nishino et al. | 126/19 R |
| 4,180,482 | 12/1979 | Nishino et al. | 252/455 R |

FOREIGN PATENT DOCUMENTS 49-31534 8/1974 Japan ................................. 427/376.5

Primary Examiner—Sadie L. Childs
Attorney, Agent, or Firm—Wenderoth, Lind & Ponack

[57] ABSTRACT

The present invention provides a coated metal substrate useful for decomposing cooking residues, e.g. oils through a gasification cracking reaction by providing a specific catalytic surface. The catalyst is at least one of Group 1A or 2A oxides or compounds of the formula $(MA)_x(MB)_y(O)_z$ where:
MA: element of Groups 1A or 2A
MB: element of Group 3A or 4A
O: oxygen
x, y, z: integer.

4 Claims, No Drawings

COATED SURFACES CAPABLE OF DECOMPOSING OILS

This application is a continuation of now abandoned application Ser. No. 263,177, filed May 13, 1981, which in turn is a continuation of application Ser. No. 085,059, filed Oct. 12, 1979 now abandoned.

BACKGROUND OF THE INVENTION

The present invention relates to coated surfaces designed to catalytically remove food and other cooking residues through application to the oven of the cooking device or the like. To effectively perform catalytic action on the coated surfaces using an oxidation catalyst, sufficient contact between the catalyst and oxygen (air) is required. However, it is difficult to simultaneously provide, for the surfaces, thereof abrasion resistance as well as surface characteristics such as hardness or the like, and catalytic effect. The amount of the residues scattered on the inner walls of the cooking device oven is beyond the catalytic capacity during the real cooking operation. The surfaces are covered with the residues in a short time, thus immediately deteriorating the catalytic effect.

The temperatures of the oven inner faces of the cooking devices are approximately 200° to 300° C. The reaction between the oxidation cataylst and organic residues is likely to cause oxidation.dehydrogenation reaction, instead of complete oxidation reaction, to make the organic matter carbonaceous, which is difficult to clean off. The present inventors have considered that the conventional cleaning, coating technique primarily using the oxidation catalyst is not practical. Since the cooking residues such as fatty acids or the like ordinarily have boiling points of approximately 200° to 300° C., for skilful use of evaporation and furthermore the gasification through decomposition of these compounds into compounds each having a boiling point less than 200° to 300° C. will serve to effectively clean the cooking residues. Accordingly, the present invention seeks to provide catalysts for the removal of such residues along the lines discussed above.

SUMMARY OF THE INVENTION

A major point of the present invention relates to a catalyst for effectively gasifying the fatty acid or the like at temperatures of 200° to 300° C. Various conventionally-known surface treating techniques can be applied as a support for effectively dispersing and supporting the catalyst on the surfaces. As preferred examples in practical application an, inorganic coating with alkali metal silicate being used as a binder, inorganic coating with metallic phosphate being used as a binder, or the like are provided. As a gasified decomposition cataylst for the fatty acid, (A) oxides of 1A group or 2A group in a periodic law table, (B) compounds represented in an equation $(MA)_x(MB)_y(O)_z$, wherein MA: element of Group 1A or Group 2A
MB: element of 3A Group or 4A Groups
O: oxygen
x, y, z: integer a compound of the kind or more selected from the (A) and (B) groups or a compound of one kind oxide or more of an element selected from a group of Ti, Fe, Ni, Co, Cr, Ag is effective.

When catalyst exhibits the effective results on the support of a matrix coating material, mixing conditions between the catalyst and the inorganic coating of the support is important. If the catalyst and the inorganic coating of the support are completely mixed, the catalyst is enveloped in a film and cannot provide an effective result. Namely, the mixing conditions for the catalyst and the inorganic coating of the support for the catalytic action should be imcomplete where the catalyst does not enter the coating. Also, since the decomposition reaction with the catalyst does not require oxygen, the porosity of the surface is not required to be higher than in the case of the oxidation catalyst. Accordingly, coated surfaces which are extremely rigid and durable can be formed.

DETAILED DESCRIPTION OF THE INVENTION

U.S. Pat. No. 3,460,523 (Stiles) has proposed coating surfaces to catalytically clean the food residues from ovens. Stiles has successively proposed a method of dispersing the oxidation catalyst into glass frit, instead a water glass group bonding agent, and the other methods, which are in practical use. At the present time, Stiles' former method is inferior in abrasion resistance or corrosion resistance when evaluation has been made in terms of surface film, and is inferior in that the accumulation capacity of the residues on the coated surfaces is smaller due to relatively thin film. Continuous self-cleaning of an enamel type becomes more prevalent. The latter method is mainly used. Representative of the latter methods is a proposal by Lee et al. (U.S. Pat. Nos. 3,547,098, 3,576,667 and U.S. Pat. No. 3,598,650). Not only food, but also seasonings or the other materials are responsible for dirty ovens. Particularly, a material which causes not only soiling, but also various other unpleasant conditions is fat. The conventional method uses an oxidation catalyst, which has superior catalyst activity with respect to the oxidation reaction, to catalytically oxidize cooking-residue organic compounds including the fat for cleaning applications.

However, the oxidation catalyst is delicate. The cooking residue organic compound is removed when the compound has been heated in air for, at least, approximately one hour at 600° C. When the organic compound is subjected to such conditions, evaporation and, thermal cracking reaction simultaneously occurs and furthermore oxidation also occur. In the form of the oxidation reaction, oxygen bonds with the organic compound and in another form, dehydrogenation occurs. Through the visual evaluation, the organic compound is gradually carbonized and finally the carbon is gradually oxidized.

The oxidation catalyst can activate the oxidation reaction to effectively perform the oxidation reaction at lower temperatures. However, at a temperature of 600° C., the same process as where the organic compound has been removed only by heat cannot be performed at lower temperatures. In a case where organic compound residues similar to carbon are fired at 600° C. and cleaned, the carbon is oxidized and disappears in a form close to combustion. At temperatures of 200° to 300° C. where the oven condition of the cooking device is provided as described as hereinabove, it is not easy to perform the oxidation reaction, which burns the carbon, using the oxidation catalyst.

Also, it is inferred that the contribution of the oxidation catalyst provides complete oxidation reaction, namely, the organic compound can be completely oxidized into water and carbonic acid gas. However, this inference is unreasonable.

The present invention is completely different from the conventional one where the cleaning is performed using the oxidation catalyst. Namely, the residues such as oils or the like are inconvenient on the surfaces, since they exist in liquid state or solid state. The residues on the surfaces are removed when they are changed into gaseous state to be released from the surface. When the oils in solid state are caused to change into gas condition at temperatures of 200° to 300° C., the catalyst used is not required to have stronger activity. The superior effect can be provided with a catalyst which activates the gasification cracking reaction. On the basis of this concept, a catalyst such as described hereinabove has been discovered.

In the conventional technique, manganese, iron cobalt, zirconium, chromium, copper, which are metallic oxide having strong oxidation capability, or rare earth metallic oxide or the like are used as oxidation catalysts. Accordingly, the conventional disadvantages are that the color of the coated surfaces is restricted to black as a main color, the surface hardness becomes lower and abrasion resistance is extremely deteriorated due to the requirement of sufficient exposure of these catalysts to the film surface to effectively exhibit the catalytic capability, or the film become fragile due to requirement or higher porosity which is indispensable in order to sufficiently diffuse the oxygen to the oxidation catalyst.

According to the present invention, it is required to control the oxidation reaction as much as possible in the cleaning reaction of the oils to perform the gasification cracking reaction. As for the reaction, the supply of the oxygen is not required. Since the reaction is performed between the oil of liquid phase and the catalyst on the surfaces, porosity at a level where the oxidation catalyst is used is not required. Thus, the film to which the catalyst is not added is not required to give up its own original nature due to porosity.

Since the gasification cracking catalysts in a system discovered by the present invention are mostly white, it is possible to color the surfaces to an optional color through combination with a proper pigment.

The present inventors had doubts that salad oil or the like could be oxidized into water and carbonic acid gas upon contacting of the salad oil or the like in liquid state with the conventional oxidation catalytic surface. On this type of conventional enamel coating we analyzed gas produced through thermal cracking in air under contact with the salad oil (soy bean oil), using a gas chromatograph. No carbon dioxide gas was detected through variation in conditions (after being left for one hour with temperature up to 350° C.). This fact indicates that the contribution of these oxidation catalysts is quite different from the complete oxidation.

As a process as for causing the oil heated to become tarry in air, there are considered a process where it is partially oxidized and is polymerized through an intermediate such as peroxide or the like or a process where it is dehydrogenated and then is depolymerized through an olefin stage or the like. According to the inferences of the inventors, when a strong oxidation catalyst has been introduced into such reaction system, strong dehydrogenation occurs to promote tar or hardening. From such a point of view, the use of oxidation catalyst is not indispensable as a method of cleaning the cooking-residue organic compound. The cleaning operation may be made in quite a different direction. An effective material was investigated from a view point of the thermal cracking capability of the salad oil (soy bean oil). Methane, ethylene, ethane, carbon monoxide, formaldehyde, etc. were produced as gaseous decomposition products. It was determined by analysis that cracked hydrocarbon, which was different from composition contained in the salad oil itself, in addition to the above-described elements was produced in the thermal cracking operation under air co-existence of the salad oil.

In the test conditions, 1.0 $\mu$l of salad oil was mixed, using a microsyringe, with about 2 mg of compound particles. They were decomposed, for ten minutes at 300° C., inside a closed glass container. Thereafter, the produced gas was introduced into a gas chromatograph for analysis.

As the analysis conditions, $N_2$ carrier, (60 ml/min) a FID detector ($H_2$ flow rate: 60 ml/min, air flow rate: 0.5 l/min) were used. As the column conditions, silicone GE SE-30.5% liquid phase (Shimalite W. carrier) of 3 mm$\phi \times$ 3 m was used. It was retained, for five minutes, at 150° C. and thereafter the temperature-rising analysis was performed till 250° C. at the temperature-rising speed of 5° C./min to detect the cracking-produced gas.

Under the above conditions, a cracked decomposition product was detected at retention times such as 100, 106, 139 and 173 minutes although the identification was not reached (two former compounds are considered as methane and ethylene).

The integration results (numeral values integrated by the use of digital integrators, i.e., the total sum of coefficient values of the four cracked products) of detection peak area about the representative material are shown in Table 1.

Metallic oxides of Groups 1 to 3 of the Periodic table, and particularly oxides of Group 1A Group 2A alkali metal and alkali rare earth metals are provided as metallic oxides or compounds showing superior catalytic activity for the decomposition in air of the salad oil, (soy bean oil) in accordance with Table 1.

TABLE 1

Comparison between salad oil decomposing capabilities of various compounds

| Oxides | Metal Group of Periodic Law table | Coefficient values | Compounds | Group of Periodic Law table | Coefficient values |
|---|---|---|---|---|---|
| blank | — | 6871 | $K_2CO_3$ | 1A 4A | 21246 |
| CaO | 2A | 14332 | $CaSiO_3$ | 2A 4A | 58626 |
| $Na_2O$ | 1A | 18756 | $CaAl_2O_4$ | 2A 3A | 58804 |
| $K_2O$ | 1A | 20211 | $MgSiO_3$ | 2A 4B | 56273 |
| MgO | 2A | 40555 | $KAlO_2$ | 1A 3A | 8285 |
| CuO | 1B | 950 | $BaSiO_3$ | 2A 4A | 48018 |
| $TiO_2$ | 4B | 7800 | $BaTiO_3$ | 2A 4B | 10362 |
| NiO | 8 | 9559 | $Li_2SiO_3$ | 1A 4A | 12538 |
| $MoO_3$ | 6B | 4058 | $Na_2CO_3$ | 1A 4B | 13855 |
| $Fe_2O_3$ | 8 | 21697 | $CaCO_3$ | 2A 4A | 6678 |
| $Co_2O_3$ | 8 | 7416 | Ni-MgO | 8 2A | 9471 |
| $MnO_2$ | 7B | 100 or less | $Ca(OH)_2$ | 2A | 19261 |
| $Cu_2O$ | 1B | 4600 | | | |
| ZnO | 2B | 5563 | | | |

TABLE 1-continued

Comparison between salad oil decomposing capabilities of various compounds

| Oxides | Metal Group of Periodic Law table | Coefficient values | Compounds | Group of Periodic Law table | Coefficient values |
|---|---|---|---|---|---|
| $Cr_2O_3$ | 6B | 8367 | | | |
| $Al_2O_3$ | 3A | 5350 | | | |
| $SiO_2$ | 4A | 5424 | | | |
| $Ag_2O$ | 1B | 13306 | | | |
| $SnO_2$ | 4A | 6608 | | | |

Referring to Table 1, the superior compounds are compounds represented by the formula of $(MA)_x(MB)_y(O)_z$.

It can be understood that MA is preferably an element from Groups 1A or 2A, and MB is preferably an element from Groups 3B or 4B.

Particularly, when MA is composed of Na, K, Ca, Mg and MB is composed at C, Si, Al, it is found out that the best result can be obtained. $MnO_2$ or CuO, which has been well-known as a so-called oxidation catalyst, interferes with the decomposition in this form.

In the case of these strong oxidation catalysts, it is also considered that dehydrogenation occurs and the decomposition occurs in a different form.

However, the use of $MnO_2$, CuO or the like in their active condition is avoided for our objectives.

Also, metallic oxides such as Ti, Fe, Ni, Co, Cr, Ag, among metallic oxides exhibit activity in gasification decomposition. Particularly, iron oxides exhibits superior activity.

Since the effects of these catalysts remain unchanged even in an $N_2$ atmosphere, it is considered that the thermal cracking of the fatty acid is activated in a form irrelevant to oxygen.

The catalyst of the present invention is required to be added so that the catalyst may exist, in proper dispersion, in a surface coating material having proper thermal resistance. The surface coating material base is applicable to the well-known various coatings. It may be water glass group compound proposed by Stiles or glass frit proposed by Lee et al., discussed above. In addition, it is applicable to various thermal resistance paints or enamel.

As a surface coating material base which is industrially lower in cost and can provide a superior coating a coating system using an inorganic binder is provided. As a representative coating systems, alkali silicate or metallic phosphate is used as a binder.

It is known from Stiles supra, that the alkali silicate is used as bonding agent for various objects. Stiles recognizes that it has been known to the persons skilled in the art to use metallic oxide group pigments in a substantial amount for coloring in the inorganic paint, with the alkali silicate as a major composition.

In most cases, these pigments are composed of metallic oxides or compounds which satisfy such oxidation catalyst conditions as stated by Stiles, such as zirconium, titanium, vanadium, chromium, manganese, iron, cobalt, nickel, tungsten, molybdenum, copper, zinc and rare earth oxide, and the precious metals, i.e., palladium, rhodium, ruthenium, osmium, iridium, and platinum, and their mixtures.

Although the conventional silicate group inorganic paint contains metallic oxide of 10% or more and silicate compound of 5% or more, effects reported by Stiles are not provided at all, because the metallic oxide used in the conventional paint is in the form of a compound suitable as a pigment, but not as a highly active catalyst which is high in reactivity; and the metallic oxide of the pigment is mostly wrapped in a film of alkali silicate which is free from catalyst activity as already recognized in the catalyst circle before Stiles' proposal, so that Stiles' catalytic effect cannot be exhibited.

Most pigments of the inorganic paint are considered to have been wrapped in a film of the alkali silicate, because the the coated surfaces of the paint are extremely hard and, similar to hardness of the single film of the alkali silicate; or the surfaces are flat, being free from unevenness as directly observed by a scanning type of electronic microscope.

According to Stiles, an adjusting method was adopted which involves stirring and mixing the silicate group bonding agent and the catalyst, whereas in the single inorganic paint before prior to invention, the silicate group bonding agent and the pigment were mixed for at least 48 hours, using a powerful mixing means such as ball mill or the like. The coated surfaces provided through application of the paint, adjusted in the method of the latter, on the metallic surfaces become almost flat, being almost free from porosity with the pigment being almost wrapped in the film of the silicate.

According to the evaluation of the present inventors, the characteristics of Stiles' invention, which are different from the conventional inorganic paint, are that the mixing between the metallic oxide and the silicate group bonding agent is caused to be sufficiently performed for complete resolution or the mixing operation therebetween is insufficiently performed so that they may hardly be resolved. Since it is difficult to conclusively evaluate the conditions of preparation only from the finished coating film, the evaluation depends upon the porosity only to clearly distinguish the difference. In this sense, the porosity is very important to Stiles' invention. As described hereinabove, Stiles' method is inferior as a surface coating due to this porosity and is inferior to the enamel type.

The effect of the present invention will be described hereinafter with reference to the following embodiments.

EMBODIMENT 1

As a silicic acid compound on the market, lithium silicate sol ("Nissan Chemistry LSS-45") was used. As a compound which was effective in Table 1, CaO, MgO, $CaSiO_3$, $CaAl_2O_4$ were used and were mixed so that the proportion of each catalyst component becomes 20%. It was applied, with a brush, on a test piece (SPC-1) of 10 $cm^2$ and was baked at 200° C. for 30 minutes. Thereafter, at 550° F. (approximately 288° C.), the salad oil of approximately 3 μl was repeatedly dropped, as a spot, for evaluation of cleaning capability. In either case, complete cleaning was confirmed, without any trace, after 20 minutes. As they were white, the extent to which they were cleaned was easier to be observed. The oil, when colored grey, was thereafter cleaned so that traces thereof gradually disappeared.

EMBODIMENT 2

Since the surface physical property of Embodiment 1 was not always superior in adherence property, etc., sodium silicate group paint "Ceramitite" of Shikoku Kaken Industry Ltd., Japan was used as a heat resisting paint, and was satisfactory in physical properties. Various types of paints were available. Fundamentally, the paints are respectively composed of a water glass bonding agent, main agent with pigment and filling agent as major components, and hardening agent with aluminum phosphate, zinc oxide, etc. as major components. Paint, which had no pigment was prepared using "Ceramitite:King". $CaSiO_3$:6 parts by weight and $CaAl_2O_3$:24 parts by weight were added as catalyst to the paint 100 parts by weight. They were mixed by ball mill to prepare paint. The milling time in this case is preferably within one hour. This paint was applied on an aluminum treated steel plate of 10 cm in square (plate thickness 4 mm) and was baked for one hour at 300° C. The same test as that of Embodiment 1 was carried out on the test piece. The coated film was 100μ in thickness and was flat, being almost free from porosity. In a cleaning evaluating test, oil stains were cleaned after twenty minutes. The physical property of the coated film was extremely superior and was the same in adherence, abrasion resistance, water resistance, humidity resistance, vapor resistance, heat resistance, heat impact resistance or the like as that of the conventional enamel product. When the "Ceramitite:King" (black type: containing 30% composite metal oxide group pigment) was applied, the oil remained tarry, thus resulting in no cleaning effect.

EMBODIMENT 3

In this embodiment, as pigment-containing paint, a test was made with the same "Ceramitite" (white type: containing approximately 10% $TiO_2$ as pigment) (however, in this case, $TiO_2$ is milled, as paint, with ball mill for forty-eight hours or more, and thus it is considered to be completely wrapped in silicate film) as base. Since the paint is white, coloring (blackening) due to tar formation in the salad oil or the like is evaluated. A test piece (40 mm × 80 mm × 0.6 mmt) was disposed on a hot plate, which was set to approximately 250° C. Approximately 30 mg of salad oil was added as a spot so that the salad oil might be distributed, in approximately 1 mg/cm², on the test piece. The cleaning properties were observed for various coatings.

When the catalytic system of the present invention is used, the porosity is not always required to be high as described already. However, some porosity is required to effectively promote contact with the the catalytic surface. In this sense, a higher porosity is preferred within a range such that the physical property of the film may not be deteriorated. It is considered that approximately 10% porosity will do.

Comparative data are shown, in Table 2, regarding the cleaning capability of the salad oil at 250° C. in various coating systems. Cleaning factor indicates corrected blank (where only the salad oil is left on iron plate not treated) reduction, and is calculated from weight change before and after thirty minutes' test. The film is thermally treated in advance so that a constant amount may be provided at the same temperature.

2% potassium carbonate by weight, 1% calcium oxide by weight, 2% calcium silicate by weight and 2% alumina cement by weight were added to the last system described in Table 2, i.e., the paint "Ceramitite". In addition, a system where 6 ml/100 g paint glycerin was added was best. Traces completely disappeared in a period of thirty minutes' testing. Since palmitic acid, with a boiling point of 271° C., or the like are contained, considering the composition of the salad oil, 100% cleaning action is considered due to a fact that it was thermally cracked even at 250° C. due to the catalytic effect and was evaporated as a low boiling point material.

TABLE 2

| | Comparison between salad oil cleaning capabilities of various catalytic coatings | |
|---|---|---|
| Coating system | Glycerin addition (ml/100 g paint) | Cleaning factor (%) |
| "Ceramitite" + 5 wt % $K_2CO_3$ | none | 68 |
| " | 6 | 75 |
| "Ceramitite" + 5 wt % $CaSiO_3$ | 10 | 83 |
| "Ceramitite" + 5 wt % alumina cement | 10 | 85 |
| "Ceramitite" + 5 wt % CaO | 10 | 80 |
| "Ceramitite" + 2 wt % CaO + 2 wt % $K_2CO_3$ | 10 | 83 |
| "Ceramitite" + 2 wt % $CaSiO_3$ + 2 wt % CaO | 10 | 86 |
| "Ceramitite" + 2 wt % $CaSiO_3$ + 2 wt % alumina cement | 10 | 90 |
| "Ceramitite" + 2 wt % $K_2CO_3$ + 2 wt % $CaSiO_3$ | 10 | 93 |
| "Ceramitite" + 2 wt % $K_2CO_3$ + 1 wt % CaO + 2 wt % alumina cement | 6 | 97 |
| "Ceramitite" + 2 wt % $K_2CO_3$ + 1 wt % CaO + 2 wt % $CaSiO_3$ + 2 wt % alumina cement | 6 | 100 |

In addition, the same test was carried out using lard, with the same results. However, the lard was larger in its cleaning factor value.

Calcium oxide or the like acts as a hardening accelerator concerning the hot life which becomes a problem in practical application in terms of painting. 10% addition of the calcium oxide produces obstacles. However, the total addition amount of these catalysts, if 8% or less, hardly causes problems in practical application.

Concerning alkali metallic compound such as potassium carbonate or the like, where a material to be coated is aluminum or the like, the film alkalinity is enhanced and blistering may be caused by hydrogen produced through reaction during the baking operation or film whitening phenomenon (excessive alkali reacts with vapor, carbonic acid gas or the like in atmosphere to produce white compound) may be caused. Accordingly, no addition is sometimes better.

The coated face itself thus formed is almost the same, in physical property, as the conventional enamel products.

EMBODIMENT 4

A catalyst was added to "Sumiceram P Type", phosphate group inorganic paint, as base of Sumitomo Chemistry Company. Then, a test was made. The paint uses aluminum phosphate as a binder. The aluminum phosphate is acid. When the gasification cracking catalyst is added to the aluminum phosphate, the binder may react with a catalyst, if the catalyst is a basic compound, to gel the paint.

At first, only the paint was applied (film of approximately 100μ thick after drying) on aluminum treated steel plate (10 cm in square, 0.4 mmt in thickness). The baking operation was performed for ten minutes at 200° C. after ten minutes' drying operation at 100° C. Finally, the baking operation was performed for thirty minutes at 300° C. This film was superior in adhesion, water resistance, abrasion resistance, thermal impact resistance, heat resistance, steam resistance, chemical resistance, stain resistance, corrosion resistance and the like, but was not capable of cleaning the oils.

We evaluated the oil cleaning capability by the following tests. Namely, a test piece of 10 cm in square was disposed on a hot plate which was set to a temperature of 250° C. The salad oil (soy bean oil) of 1.0 μl was scattered in approximately fifty points and was dropped on the film surface to visually check how oil stains changed. In the case of the former paint only, the salad oil residues remained and became tarry on the entire surfaces of the test piece.

Then, a system to which 5% calcium silicate by weight was added was produced. In this case, the paint was remarkably gelled. However, viscosity was prepared with addition of approximately 10% water. The film had many cracks therein and was inferior in adhesion. The other physical properties were good. Stains were removed after five minutes through the cleaning test. Then, 10% iron oxide ($Fe_2O_3$) was added by weight. The same test was carried out. In this case, the same superior physical property of the film as that of the paint itself was obtained. Even at the cleaning test, two or three tar traces each being of approximately 2 mmφ remained. But significant capability was obtained.

Then, the same test was carried out about a case where 5% iron oxide by weight and 1% lime aluminate by weight were added.

The film was very superior in physical property (impact resistance or the like was superior as compared with the paint only). Stains disappeared after several minutes. The same tests were repeated seven times with no tar traces remaining on the surfaces.

Such superior effects as described hereinabove were provided, because instead of multiplication action of both catalysts. some addition of an alkaline earth metal partially gelled the paint, with the result that the catalyst compound was considered to be adapted to be exposed without reacting with the binder, particularly on the surface layer.

In the case of the metallic phosphate group binder, the added amount of the catalyst is preferred 5% or more in the oxide of transition metal and 1% or less in alkali rare earth metallic salt or the like. Particularly, a method of jointly using both of them is best. Even in this system, excessive porosity is not required, considering the demand of the catalytic reaction itself. Approximately 10% porosity will do from the viewpoint of the practical film physical properties.

Since a sufficient effect can be exhibited even with porosity, the film physical property can be retained at its superior level.

Effects of controlling the tarry condition of oils such as salad oil or the like have been described. They can be sufficiently effective even for the kerosene group or the like, where the tar production is a problem.

The practical effect in relatively smooth surfaces is larger. In the case of residues which the catalyst can not remove, e.g., inorganic soil such as salt or the like, it is required to wipe the surfaces with a cloth or the like. The self-cleaning surfaces are not always complete. In the case of the conventional porous coating, the cloth fibers were caught therein, being adhered in balls shapes, thus resulting in obstacles to practical application. In this case, problems such as described hereinabove do not occur.

In terms of the cleaning speed, a fact that the oil is removed through evaporation cannot be neglected in the cleaning phenomenon. In the conventional porous coating, the oil penetrates into the coating, thus causing hardening reaction. The oil is not spread on the surfaces, delaying the evaporation. On the other hand, the oil spreads rapidly on the smooth surfaces and is immediately evaporated. Since approximately 70% of salad oil is adapted to be evaporated at a temperature of 250° C., the skilful use of this evaporation contributes towards the advantageous cleaning speed.

Another advantage is that at a low temperature of 100° C. or less, less permeation is provided on the smooth surfaces. In the conventional porous coating, the oil is evaporated and cracked where the temperature of the oil permeated portion becomes 250° C. through the following cooking cycles. Thus, unpleasant smells which are caused through the decomposition of the oil remain fully within the oven of the cooking device. The phenomenon is completely undesirable when the cooking being performed is adversely affected with the former unpleasant smells. This is one of the disadvantages with the present porous coating. The smooth surfaces of the present invention free from this problem.

In the relationship between the catalyst addition amount and effect, the effect can be recognized through addition of approximately 1% by weight in the case of calcium silicate or the like. The calcium silicate is lower in specific gravity and is difficult to be distributed into the paint. But it can be effectively distributed, in small amount, on the coated wet surfaces and can exhibit its effect as is after the baking operation. A highly active catalyst such as calcium silicate, lime aluminate or the like is added 30% by weight, using alkali metal silicate group binder to provide surprisingly superior cleaning capability. In this case, cracks are likely to be caused in the film, developing into the deterioration of the film physical property. As the level of the catalyst addition amount, approximately 4% to 10% by weight is optimum as total amount. However, when the catalyst uses oxides of Ti, Fe, Ni, Co, Cr and Ag, addition of at least 5% or more by weight is required, because these metallic oxides are likely to be wrapped in the film and furthermore the specific gravity is higher. In this case, addition or approximately 30% by weight hardly damages the film physical property. However, these metallic oxides are somewhat inferior in the cleaning capability of the fatty acid.

Furthermore, dispersion of the catalyst into the paint is required to be carried out using dispersion agent such as ball mill or the like. The cleaning capability varies depending upon dispersing method and time. When the dispersion is completely performed, the catalyst is completely wrapped in the binder and a catalyst exposed on the surface cannot be provided. However, when the dispersion is incomplete, the film physical property is deteriorated. Accordingly, the optimum dispersion time exists. When the catalyst is dispersed by the use of the ordinary ball mill, the catalytic effect is obtained. Optimum dispersion time to ensure sufficient film physical property is from half an hour to one hour. This has nothing to do with the type of the binder.

In a film making method for surfaces such as metallic faces, brush painting, air spraying, electrostatic painting or the like, can be applied as in the ordinary painting. The film is formed from $20\mu$ to approximately $180\mu$. The film thickness of approximately $50\mu$ to $150\mu$ provides good physical property. A baking hardening operation is desirably performed in a hot blast stove. A temperature of approximately 350° C. at the most for approximately thirty minutes will do. As compared with the conventional enamel products, the stove temperature control is wider in tolerance and the baking operation can be performed at lower temperatures and for shorter period of time, thus resulting in superior productivity and extremely advantageous cost. As the foundation face, not only the faces of metals such as iron, aluminum, etc., but also the faces of ceramics can be coated with paint, so that application can be made to almost the entire oven-inner face of the cooking device and the parts therein. The method of the present invention is considered to be superior not only in cost, but also in the range of practical application.

As described hereinabove, it has been confirmed that the catalytic coating of the present invention has novel effects completely different from the range of this type of conventional coating, can exhibit the self-cleaning effects extremely superior in practical application, has a quality level, in coating, equal to or superior to the conventional enamel product, and has superior characteristics unavailable with the porous coating.

What is claimed is:

1. A coated metal substrate having a surface capable of decomposing oils through a gasification cracking reaction, said surface being produced by a process consisting essentially of applying a paint to said metal substrate and sintering said paint, said paint including a catalyst consisting of at least one or more compounds selected from the group consisting of:
   (A) $Na_2O$, $K_2O$, $CaO$ or $MgO$, and
   (B) compounds represented by the formula $(MA)_x(MB)_y(O)_z$, wherein (MA) is at least one of Na, K, Ca or Mg and (MB) is at least one of C, Si, or Al; O is oxygen and x, y and z are integers, said catalyst being the sole effective catalyst for decomposing oils and being present in an amount sufficient to effect such decomposition, and
an inorganic binder, a hardening agent and a pigment.

2. The coated metal substrate as claimed in claim 1 wherein at least one calcium silicate and calcium aluminate are used as said catalyst.

3. The coated metal substrate as claimed in claim 2 wherein said calcium silicate and said calcium aluminate are present at 4 to 10 percent by weight of said binder.

4. The coated metal substrate as claimed in claim 2 wherein calcium aluminate is used as said catalyst.

* * * * *